Oct. 17, 1967  G. B. FEFFERMAN  3,347,418
LIQUID DISPENSER UTILIZING CONTROLLED GAS PRESSURE
Filed Oct. 23, 1965
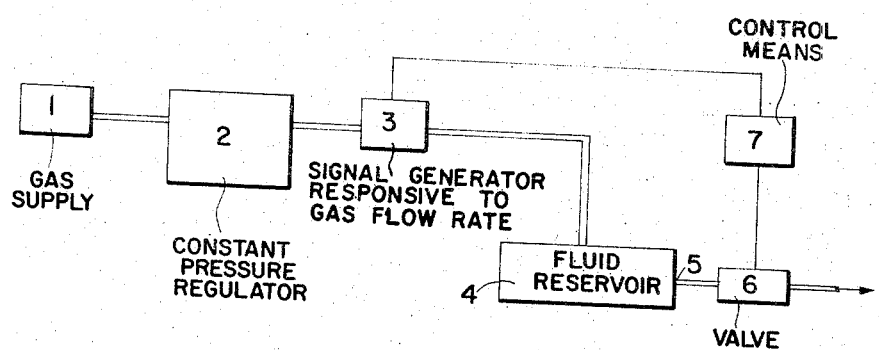
INVENTOR.
GERALD B. FEFFERMAN
BY
BROWN and MIKULKA
ATTORNEYS United States Patent Office 3,347,418
Patented Oct. 17, 1967

3,347,418
LIQUID DISPENSER UTILIZING CONTROLLED GAS PRESSURE
Gerald B. Fefferman, Framingham, Mass., assignor to Polaroid Corporation, Cambridge, Mass., a corporation of Delaware
Filed Oct. 23, 1965, Ser. No. 503,716
4 Claims. (Cl. 222—61)

ABSTRACT OF THE DISCLOSURE

The present invention relates to an apparatus for controlling fluid flow rates and, more particularly, for dispensing liquids from a container at controlled, uniform, low rates of liquid flow, which apparatus includes a closed fluid reservoir possessing valve means coupled to an outlet port, gas supply means adapted to supply gas, to the reservoir, at a substantially constant pressure, and means responsive to the mass flow rate of gas for adjusting the valve means so that a predetermined mass flow rate of gas is maintained.

---

In the operation of present day coating apparatus where films of critical thinness are desired to be deposited, a problem has arisen in accurately controlling the flow rate of the liquid coating material from a liquid storage reservoir to the coating applicator, such as an extrusion coater. The flow rate of liquid must be capable of being metered in quantities of less than one cubic centimeter per second in selected instances, in order to obtain accurate coating film thinness, and conventional liquid flow measuring devices have not allowed for convenient automatic control of liquid flow rates in such small quantities.

The present invention relates to an improved apparatus for dispensing liquids at controlled rates of liquid flow comprising, in a gas pressurized liquid supply system having a substantially constant gas pressure, means for measuring the mass flow rate of the gas which is used to force the liquid from its reservoir, which means includes means for actuating liquid outflow control means to vary the outflow of liquid from the system so as to maintain a predetermined mass flow rate of gas into the liquid reservoir. Since the mass flow rate of gas is proportional to the liquid outflow from the system, maintenance of the mass flow rate at a predetermined value maintains the liquid outflow at a predetermined desired rate.

In acordance with the present invention, a closed liquid reservoir having a gas inlet pipe and a liquid outlet pipe is connected to a gas supply system, a constant pressure regulator being attached to the gas supply system to maintain the pressure within the liquid supply system at a substantially constant value. A mass flow rate measuring means which can determine the mass flow rate of the gas is interposed between the gas supply (and the constant pressure regulator) and the liquid reservoir. Valve means for controlling the liquid outflow rate is connected to the outlet pipe of the reservoir, and means for translating the information received from the mass flow rate measuring means into operating commands for the valve means is connected to the mass flow rate measuring means and the valve means, thereby allowing for the control of the amount of liquid being discharged from the reservoir by a determination of the mass flow rate of the gas which is pressurizing the system.

The invention accordingly comprises the apparatus possessing the construction, combination of elements and arrangement of parts which are exemplified in the following detailed disclosure, and the scope of the application of which will be indicated in the claims.

The invention will be more fully discussed in connection with the drawing which illustrates schematically an apparatus for accomplishing the present invention. A gas supply 1 in the form of a high pressure container, such as a steel gas bottle of the type commonly used to transport gases under high pressure, is connected to a constant pressure regulator 2 for maintaining the pressure within the system at a substantially constant value. The pressure regulator is of a type which can regulate pressure within a range of ± (plus or minus) 0.01 lb./sq. in. of a desired value and a pressure regulator of this type can be purchased commercially from the Taylor Manufacturing Company, Asheville, N.C. The accurate regulation of the gas pressure is necessary to insure that the values obtained from the mass flow rate measuring means are directly related to flow and not pressure changes. If desired, a gas pressure regulator of the type normally used in regulating gas pressure in connection with an oxy-acetylene welding system can be interposed between the gas supply and the constant pressure regulator to provide the constant pressure regulator with a relatively controlled pressure.

The gas which is to be used within the system can be any inert gas, such as nitrogen or helium. The only requirement for the gas is that it be non-reactive with the liquid to be dispensed.

A gas flow rate measuring means 3 is attached to the constant pressure regulator to determine the mass flow rate of gas into the liquid reservoir. Any type of device which can determine the mass flow rate of gas may be utilized in the system, the Hastings LF Mass Flowmeter, which is available from the Hastings-Raydist, Inc. of Hampton, Va., being illustrative of one such device. The Hastings LF Mass Flowmeter consists of an electrically heated tube through which the gas is allowed to pass. An arrangement of thermocouples measures the differential cooling caused by the gas passing through the tube, the amount of heat absorbed by the gas being proportional to the mass flow rate of gas therethrough. The thermocouples generate a DC voltage proportional to the mass flow rate of gas through the tube, which voltage may be used to operate a flow rate recording system and/or a flow control valve mechanism. The benefit of this device is that there are no fragile sensing elements projecting into the gas stream, and that the device depends only on the mass flow rate of the gas and its specific heat. Therefore, it is almost insensitive to pressure and temperature changes. The use of different gases requires only small calibration changes in the device.

The gas, after passing through the flow rate measuring means, is piped into a liquid fluid reservoir 4, which reservoir is provided with a liquid outflow opening 5. A servo-control metering valve 6, is connected to the outflow opening 5. A control means 7 is connected to the flow rate measuring means, and the valve 6 which control means translates the information received from the flow rate measuring means into operating commands for the servo-control valve.

There are known to the art, many ways of translating the information obtained by the gas flow rate measuring means into operating commands for the servo-control valve. The following description is illustrative of a type of control means which may be used.

Control means 7 can be in the form of a transducer, that is, a device which translates one form of energy into another form of energy. In this case, the gas flow rate measuring means emits electrical signals in the range of 0 to 2.5 millivolt which are converted in the transducer to pneumatic pressure in the range of 3 to 15 lbs./sq. in.

The pressure is then fed into a controller which is set to maintain a standard pneumatic control needle valve at a desired opening, the setting corresponding to a predetermined input pressure. As the input pressure varies above or below the predetermined input pressure (an indication of the variance of the mass flow rate of the gas), the valve will be adjusted accordingly so as to maintain the desired liquid outflow rate. The pneumatically controlled needle valve is an illustration of the servo-control valve 6.

The translation of the gas flow rate information into commands for the servo-control valve can also be accomplished by means of mechanical linkages, or through the use of an electrical system, e.g., electrical signals from the flow rate meter may operate an electric motor for opening or closing the valve. Any such system is contemplated as being within the scope of the present invention.

If desired, dampening devices may be attached to the servo-control valve to eliminate the necessity of the valve hunting for the proper valve opening.

To place the system into operation, one must correlate the desired liquid flow rate with the gas flow rate at a given system gas pressure. The gas pressure at which the system is regulated is determined by that pressure which is necessary to provide the maximum flow required, with the liquid flow control valve in the full open position. Factors to be considered include the liquid viscosity, pressure drop in the liquid lines, fittings and valves, and maximum system working pressure. Small changes in viscosity, conductivity, particle size distribution and rheological properties will not affect accuracy. The control means is then set to maintain the desired liquid flow rate.

For extremely low ranges of liquid flow, where increased system sensitivity is desired, the ratio of mass flow to liquid flow can be increased by designing the system to operate under higher gas pressures. For example, if one atmosphere gauge pressure (two atmospheres absolute) is used, approximately two standard cc. of gas will flow to replace one cc. of liquid. If the pressure is increased to three atmospheres gauge (four atmospheres absolute), four standard cc. of gas will flow to replace one cc. of liquid. In this way, the mass flow rate of gas will be higher and smaller fluctuations in the liquid flow rate will be more easily detected.

From the foregoing, though the present system is specifically designed for low fluid flow rate dispensing, it can be seen that variations can be made in any one or all of these areas to increase or decrease the fluid flow rate. Therefore, large flow rates can also be accommodated by the system of the present invention.

As can be seen from the drawing, the liquid to be dispensed from the reservoir comes into contact with only one component of the control system; namely, the servo-control valve 6. This is especially important where corrosive or low boiling materials are to be dispensed since the remainder of the control apparatus need not be built to withstand the corrosive actions of the chemicals. Also, and since the liquid to be dispensed does not contact the control system, one system may be used to dispense numerous materials from various separate reservoir containers without the necessity of cleaning out the control system each time a different material is to be dispensed.

The system of the present invention is particularly adapted to feed extrusion coating apparatus such as that shown in U.S. Patent No. 2,681,294 where the thinness of the coating is critical such as in the manufacture of photographic film. The control device may also be used for filling containers or any other such use as desired.

While the invention has been described with regard to specific equipment, it is to be understood that any equipment accomplishing the same function can be used without departing from the scope of the present invention.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. Apparatus for dispensing a liquid at a controlled rate of flow comprising:
    (a) a closed reservoir for said liquid, said reservoir having an outlet and an inlet port;
    (b) valve means coupled with said outlet port to control said rate of flow of said liquid from said reservoir;
    (c) gas supply means coupled with said inlet port to force said liquid from said reservoir, said gas supply means having means to regulate the pressure of said gas to a substantially constant value; and
    (d) means responsive to the mass flow rate of said gas for adjusting said valve means so that a predetermined mass flow rate of gas is maintained.

2. Apparatus as recited in claim 1 in which said means for adjusting said valve comprises a signal generator responsive to the mass gas flow rate interposed between said gas supply means and said reservoir and means for actuating said valve means connected to said signal generator operable on signals received therefrom to vary said flow of liquid from said reservoir so as to maintain said predetermined mass flow rate of gas.

3. Apparatus as recited in claim 2 in which said signal generator is a heated tube provided with at least one thermocouple for determining the differential cooling caused by said gas flowing through the tube, which thermocouple emits electrical signals proportional to the mass flow rate of said gas.

4. Apparatus as recited in claim 3 in which said means for actuating said valve means is a transducer which changes said signals received from said signal generator into peneumatic pressure for operation of said valve means.

References Cited

UNITED STATES PATENTS

| | | | |
|---|---|---|---|
| 2,604,383 | 7/1952 | Morse | 222—52 X |
| 3,005,411 | 10/1961 | Metz | 222—52 X |
| 3,132,767 | 5/1964 | Gardner et al. | 222—52 |

ROBERT B. REEVES, *Primary Examiner.*

HADD S. LANE, *Examiner.*